(12) United States Patent
Lee et al.

(10) Patent No.: US 10,986,457 B2
(45) Date of Patent: Apr. 20, 2021

(54) METHOD AND DEVICE FOR OUTPUTTING AUDIO LINKED WITH VIDEO SCREEN ZOOM

(71) Applicant: LG ELECTRONICS INC., Seoul (KR)

(72) Inventors: Tung Chin Lee, Seoul (KR); Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/628,973

(22) PCT Filed: Nov. 14, 2017

(86) PCT No.: PCT/KR2017/012873
§ 371 (c)(1),
(2) Date: Jan. 6, 2020

(87) PCT Pub. No.: WO2019/013400
PCT Pub. Date: Jan. 17, 2019

(65) Prior Publication Data
US 2020/0137506 A1    Apr. 30, 2020

Related U.S. Application Data

(60) Provisional application No. 62/530,269, filed on Jul. 9, 2017.

(51) Int. Cl.
*H04S 7/00*    (2006.01)
*G10L 19/008*    (2013.01)
(Continued)

(52) U.S. Cl.
CPC .............. *H04S 7/30* (2013.01); *G10L 19/008* (2013.01); *H04N 21/434* (2013.01);
(Continued)

(58) Field of Classification Search
CPC ........ H04S 7/30; H04S 1/007; H04S 2400/11; H04S 2400/13; H04S 2420/01; G10L 19/008; H04N 21/434; H04N 21/439
See application file for complete search history.

(56) References Cited

U.S. PATENT DOCUMENTS

2007/0189551 A1* 8/2007 Kimijima ................ H04S 7/302
381/97
2015/0117839 A1    4/2015 Oberbrunner et al.
(Continued)

FOREIGN PATENT DOCUMENTS

KR    10-2011-0124306 A    11/2011
KR    10-2012-0101457 A    9/2012
(Continued)

*Primary Examiner* — Andrew L Sniezek
(74) *Attorney, Agent, or Firm* — Dentons US LLP (57) ABSTRACT

Disclosed are method and device for outputting audio linked with a video screen zoom. The method of the present invention comprises the steps of: receiving an audio signal linked with a video and generating a decoded audio signal and object metadata; linking with an execution of a video screen zoom so as to change respective object gain values for objects which are present in a zoom area; and rendering the decoded audio signal by using the changed object gain values. In addition, the method for outputting audio, of the present invention, further comprises a step for changing a channel signal-specific gain value which is linked with the video screen zoom. An audio can be linked, through the method and device for outputting audio, according to an embodiment of the present invention, in accordance with the video screen zoom such that the audio which is more realistic can be provided.

10 Claims, 9 Drawing Sheets

(51) Int. Cl.
*H04N 21/434* (2011.01)
*H04N 21/439* (2011.01)
*H04S 1/00* (2006.01)

(52) U.S. Cl.
CPC .......... *H04N 21/439* (2013.01); *H04S 1/007* (2013.01); *H04S 2400/11* (2013.01); *H04S 2400/13* (2013.01); *H04S 2420/01* (2013.01)

(56) References Cited

U.S. PATENT DOCUMENTS

2016/0212563 A1\* 7/2016 Yuyama ................. H04S 3/008
2019/0139562 A1\* 5/2019 Fueg ................. H04N 21/4318

FOREIGN PATENT DOCUMENTS

| KR | 10-1682105 | B1 | 12/2016 |
| KR | 10-2017-0002119 | A | 1/2017 |

\* cited by examiner

| Syntax | No. of bite | Mnemonics |
|---|---|---|
| 501 — LocalScreenSizeInformation() { | ° | ° |
| 502 —   isCenteredInAzimuth; <br>   if(·isCenteredInAzimuth·){ | 1 | bslbf |
| 503 —     bsLocalScreenSizeAz; <br>   }·else·{ | 9 | uimsbf |
| 504 —     bsLocalScreenSizeLeftAz; | 10 | uimsbf |
| 505 —     bsLocalScreenSizeRightAz; <br>   } | 10 | uimsbf |
| 506 —   hasLocalScreenElevationInformation; <br>   if·(·hasLocalScreenElevationInformation·)·{ | 1 | bslbf |
| 507 —     bsLocalScreenSizeTopEl; | 9 | uimsbf |
| 508 —     bsLocalScreenSizeBottomEl; <br>   } <br> { | 9 | uimsbf |

(a)

| Syntax | No. of bite | Mnemonics |
|---|---|---|
| 601 — LocalZoomAreaSize() { | ° | ° |
| 602 —   bsZoomAzCenter; | 10 | tcimsbf |
| 603 —   bsZoomAz; | 10 | uimsbf |
| 604 —   bsZoomElCenter; | 9 | tcimsbf |
| 605 —   bsZoomEl; | 10 | uimsbf |
| 606 —   isObjectGainChange; <br>   it(isObjectGainChange·=·=·0) | 1 | bslbf |
| 607 —     isChannelgainChange; <br> } | 1 | bslbf |

METHOD AND DEVICE FOR OUTPUTTING AUDIO LINKED WITH VIDEO SCREEN ZOOM

This application is a National Stage Application of International Application No. PCT/KR2017/012873, filed on Nov. 14, 2017, which claims the benefit of U.S. Provisional Application No. 62/530,269, filed on Jul. 9, 2017, all of which are hereby incorporated by reference in their entirety for all purposes as if fully set forth herein.

TECHNICAL FIELD

The present invention relates to a method of outputting an audio signal linked to a video screen zoom and apparatus using the same.

BACKGROUND ART

Recently, various smart devices have been developed in accordance with the development of IT technology. In particular, such a smart device basically provides an audio output having a variety of effects. In particular, in a virtual reality environment or a three-dimensional audio environment, various methods are being attempted for more realistic audio outputs. In this regard, MPEG-H has been developed as new audio coding international standard techniques. MPEG AVC-H is a new international standardization project for immersive multimedia services using ultra-high resolution large screen displays (e.g., 100 inches or more) and ultra-multi-channel audio systems (e.g., 10.2 channels, 22.2 channels, etc.). In particular, in the MPEG-H standardization project, a sub-group named "MPEG-H 3D Audio AhG (Adhoc Group)" is established and working in an effort to implement an ultra-multi-channel audio system.

MPEG-H 3D Audio is aimed at conspicuously improving the existing 5.1 (or 7.1) channel surround systems and providing a highly-realistic three-dimensional audio. To this end, various types of audio signals (channel, object, Higher Order Ambisonics (HOA)) are inputted to reconfigure a signal to fit a given environment. In addition, it is possible to control a position and volume of an object through interaction with a user and preset information selection.

Moreover, an MPEG-H 3D Audio coder provides realistic audio to a listener using a multi-channel speaker system. In addition, in a headphone environment, a realistic three-dimensional audio effect is provided. This feature allows the MPEG-H 3D Audio coder to be considered as a VR compliant audio standard.

However, in a VR environment, most of contents are played together with video and audio, whereas video and audio are encoded independently of each other and do not interact with each other. This may become a factor for a user to drop the immersive feeling when using a VR content.

Figure 1:
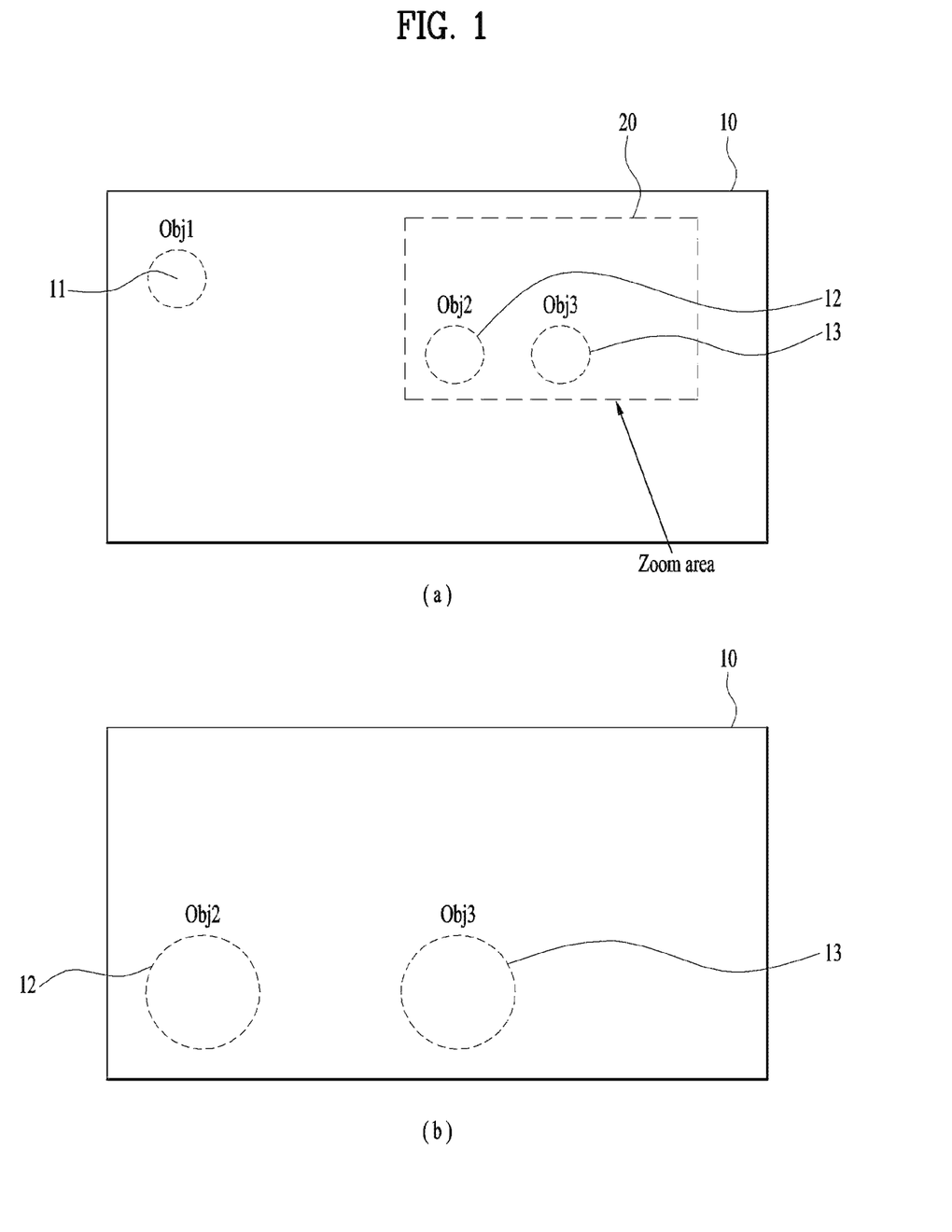
FIG. 1 is a diagram to describe the concept of the present invention.

The above problem will be described in detail with reference to FIG. 1 as follows.

A VR content is mostly played in a manner that video and audio are associated with each other. An MPEG-H 3D Audio coder is not fully liked with the video, but has a function of being associated with a screen. For example, when processing an object-based audio signal, it may receive a flag that checks whether an input object is associated with a screen. If a random object is associated with the screen, the corresponding object will also depend on the characteristics of objects in accordance with an area of viewer's interest on the screen. FIG. 1 (a) illustrates, for example, a case where a multitude of audio objects 11, 12 and 13 are present in a video screen 10. If a user zooms in on a partial area 20 of the screen 10, as shown in FIG. 1 (b), some object 11 disappear from the screen, and the positions of the objects 12 and 13 remaining on the screen are changed. Thus, the object 11 having disappeared from the screen 10 due to the zooming is not played, and only the remaining objects 12 and 13 are recognized as played at the changed positions as shown in FIG. 1 (b).

The VR audio technology should provide realism as maximum as possible to a user in a virtual space. Therefore, if it is intended to apply the zooming function shown in FIG. 1 to a VR environment, a gain should be controlled according to a zoom size as well as a position change of the object in order to provide higher realism. However, the existing MPEG-H 3D Audio fails to consider a gain change on zooming.

In addition, the existing MPEG-H 3D Audio is linked to a screen only for an object and an HOA type signal, and does not provide information linked to the screen for a channel signal. Therefore, described in the present invention is a method of processing a channel signal in association with a screen and also controlling a gain in accordance with screen zooming.

DISCLOSURE OF THE INVENTION

Technical Task

One technical task of the present invention is to provide a method and apparatus for outputting an audio linked to a video screen zoom.

Another technical task of the present invention is to provide an MPEG-H 3D Audio decoder linked to a video screen zoom.

Further technical task of the present invention is to provide a method of having a video screen information included in an audio signal for the smooth linkage between a video and an audio.

Another further technical task of the present invention is to provide a method of controlling a gain of an audio signal according to an enlargement ratio when zooming in a specific area on a video screen.

Technical Solutions

In one technical aspect of the present invention, provided herein is a method of outputting an audio, the method including generating a decoded audio signal and an object metadata by receiving an audio signal linked to a video, changing an object gain value for each object existing in a zoom area in association with a video screen zoom execution, and rendering the decoded audio signal based on the changed object gain value.

The method may further include receiving a first control flag information indicating whether the object gain value is changed. And, the changing the object gain value may calculate a new object gain value only if a change of the object gain value is allowed by the first control flag information.

The changing the object gain value may include obtaining a zoom ratio from a zoom area size with respect to a size of an entire video screen and calculating each object gain value in consideration of the obtained zoom ratio and a relative position of each object in the zoom area.

The method may further include changing a gain value of each audio channel after the rendering.

The method may further include receiving a second control flag information indicating whether a channel gain value is changed. And, the changing the gain value of the audio channel may calculate a new channel gain value only if a change of each audio channel gain value is allowed by the second control flag information.

The changing the channel gain value may include determining a channel nearest to the zoom area, determining a distance ratio between the determined channel nearest to the zoom area and a remaining channel, and calculating each channel gain value in consideration of the distance ratio per channel.

The method may further include a binaural rendering step based on a Binaural Room Impulse Response (BRIR) to output the rendered audio signal as a 2-channel surround audio.

In another technical aspect of the present invention, provided herein is an apparatus for outputting an audio linked to a video screen zoom, the apparatus including an audio decoder generating a decoded audio signal and an object metadata by receiving an audio signal linked to a video, a metadata processor changing an object gain value for each object existing in a zoom area in association with a video screen zoom execution, and a renderer rendering the decoded audio signal based on the changed object gain value.

The metadata processor may receive a first control flag information indicating whether the object gain value is changed. And, the metadata processor may calculate a new object gain value only if a change of the object gain value is allowed by the first control flag information.

The metadata processor may obtain a zoom ratio from a zoom area size with respect to a size of an entire video screen and calculate each object gain value in consideration of the obtained zoom ratio and a relative position of each object in the zoom area.

The renderer may change a gain value of each audio channel after the rendering.

The metadata processor may receive a second control flag information indicating whether a channel gain value is changed and the renderer may calculate a new channel gain value only if a change of each audio channel gain value is allowed by the second control flag information.

The renderer may determine a channel nearest to the zoom area, determine a distance ratio between the determined channel nearest to the zoom area and a remaining channel, and calculate each channel gain value in consideration of the distance ratio per channel.

The apparatus may further include a binaural renderer using a Binaural Room Impulse Response (BRIR) to output the rendered audio signal as a 2-channel surround audio.

Effects of Invention

Effects of an audio output method and apparatus according to an embodiment of the present invention are described as follows.

First, an audio becomes linkable according to a video screen zoom, whereby a more realistic audio can be provided.

Second, efficiency of MPEG-H 3D Audio implementation can be raised using the next-generation immersive three-dimensional audio encoding technique. Namely, as a syntax compatible with the standard under development of the existing MPEG-H 3D Audio, a user can appreciate an audio with an immersive feeling that does not change even with a video screen zoom.

Third, in various audio application fields such as a game, a Virtual Reality (VR) space or the like, a natural and realistic effect can be provided in response to a frequently-changing video scene.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module", "unit" and "means" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 2:
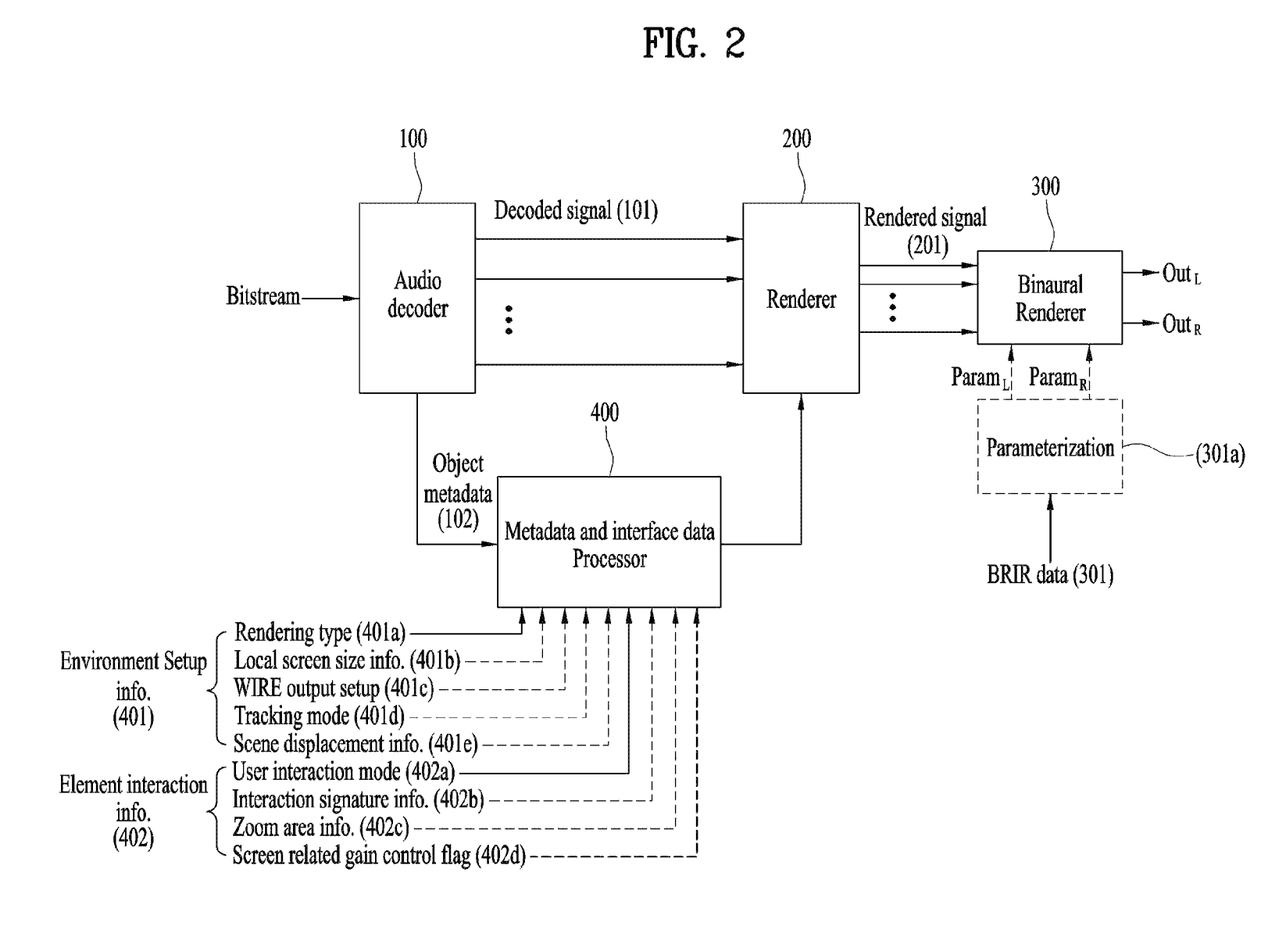
FIG. 2 illustrates an example of an audio output apparatus configuration according to the present invention.

FIG. 2 illustrates an example of an audio output apparatus configuration according to the present invention.

An audio output apparatus of the present invention includes an audio decoder 100, a renderer 200, and a metadata and interface data processor (simply, "metadata processor") 400. In addition, the audio output apparatus of the present invention may further include a binaural renderer 300 to generate a surround 2-channel audio using Binaural Room Impulse Response (BRIR) data 301 in an environment in which a 2-channel audio output is required like headphones or earphones.

An audio signal (e.g., audio bitstream) inputted to the audio decoder 100 is transmitted from an encoder (not shown) and may be an audio compression file type (.mp3, .aac, etc.). The audio decoder 100 decodes the inputted audio bitstream according to a pre-determined coding format, outputs the decoded audio signal 101, and also outputs audio metadata (e.g., object metadata) 102. In this regard, the audio decoder 100 may be implemented as an MPEG-H 3D audio decoder. An embodiment of implementation with the MPEG-H 3D audio decoder will be described in detail below with reference to FIG. 9. Yet, the essential features of the present invention are not limited to a particular format of the audio decoder 100.

The decoded audio signal 101 is inputted to the renderer 200. The renderer 200 may be implemented in a variety of ways depending on a use environment. The renderer 200 outputs a rendered signal 201. In addition, the renderer 200 may include a rendering and mixing process. Yet, in some use examples, rendering and mixing functions may be implemented as separate blocks, respectively (e.g., FIG. 9).

If a user desires to listen to an audio signal in a headphone environment, the rendered signal 201 may be outputted as a final output signal $Out_L$ and $Out_R$ in a manner of directly utilizing the BRIR data 301 or filtering BRIR parameters $Param_L$ and $Param_R$ through a parameterization 301a.

The metadata processor 400 receives an input of the object metadata 102 from the audio decoder 100. Also, external control information including environmental setup information 401 and user interaction information 402 is inputted thereto from an outside. The environment setup information 401 includes information indicating whether to use a speaker or a headphone as an audio output and/or the number and position information of playback speakers. In addition, the user interaction information 402 includes user interaction control information.

Yet, the environment setup information 401 and the user interaction information 402 may differ according to an audio decoder format.

In this regard, individual information configuring the environment setup information 401 and the user interaction information 402 may be composed of the following information. For example, the environment setup information 401 includes a rendering type 401a as information for selecting one of a speaker rendering or a binaural rendering, a WIRE output setup 401b as information for selecting whether to connect to another output device, a local screen size information 401c as viewed screens size information, a tracking mode 401d indicating a tracking mode, a scene displacement information 401e indicating a screen change, etc.

For example, the user interaction information 402 may include a user interaction mode 402a, interaction signature information 402b, zoom area information 402c, etc., and characteristics of a sound source may be changed by inputting a user's random input at any time during sound source playback.

The purpose of additionally receiving various informations in addition to the audio bitstream is to reproduce a high-quality audio in a variety of environments and to accurately locate an audio signal in a space to match a producer or user intention to enable experience of a realistic high-quality 3D audio. In FIG. 2, although the local screen size information 401b and the zoom area information 402c among the informations received by the metadata processor 400 are informations used when the audio signal is linked to the screen, they are applied to an object and an HOA type signal only and an audio signal located position is changed only. Therefore, according to the present invention, a screen related gain control flag 402d linked to the screen can be received together so that a gain can be changed according to a zoom size in the course of a screen zooming. Also, in addition to the object type, a gain can be controlled for a channel-type audio signal in a manner of being linked to the screen zooming.

Figure 3:
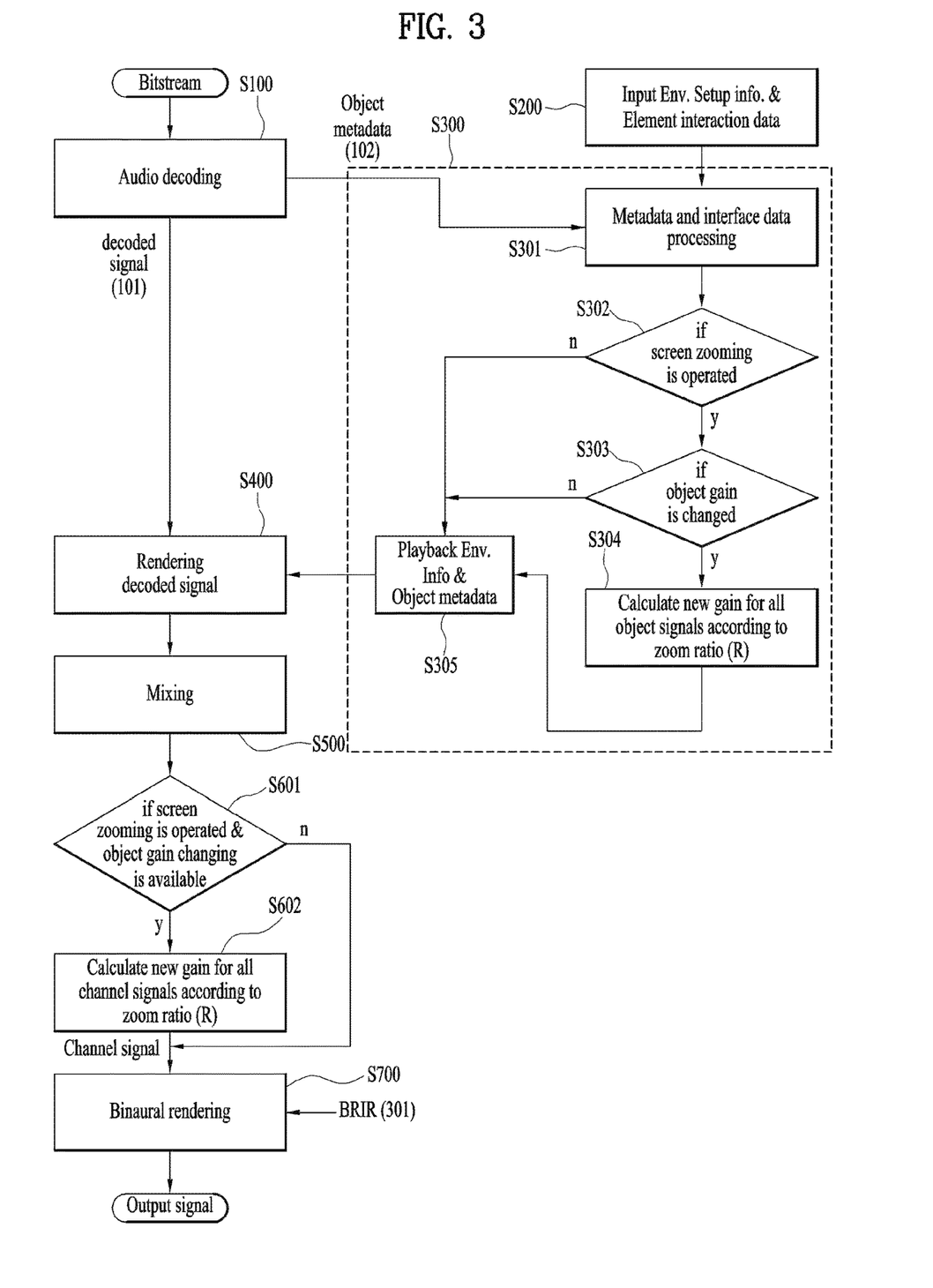
FIG. 3 is a flowchart of an audio output method in accordance with the present invention.

FIG. 3 is a flowchart of an audio output method according to the present invention.

A step S100 is a process of receiving an audio bitstream and decoding and outputting a decoded signal 101 and an object metadata 102.

A step S200 is a process of receiving environment setup information 401 and user interaction information 402 externally. In a step S300, the metadata processor 400 sets playback environment information and maps object metadata information to a configured environment. The step S300 may be operated as sub-processes in detail as follows.

A step S301 is a process of configuring playback environment information by signal-processing, the externally received environment setup information 401, the externally received user interaction information 402, and the object metadata 102.

Next, in a step S302, a presence or non-presence of a screen zooming is determined from the environment setup information 401 and the user interaction information 402. For example, a presence or non-presence of the screen zooming may be determined according to whether the local screen information 401b and the zoom-related information 402c and 402d in the received informations are received.

Hence, if a screen zooming operation is not received (S302, path 'n'), the configured playback environment information and the object metadata information are forwarded to the renderer 200 (S305). On the other hand, if the screen zooming operation is received (S302, path 'y'), it is determined whether to change the gain of object signals according to the zooming additionally (S303).

If it is determined in step S303 that the gain of the object signals is changed (S303, path 'y'), a new gain value applied to the gain of the object signals is calculated (S304). The new object gain calculation method of the step S304 will be described in detail below with reference to FIGS. 4 to 6.

On the other hand, as a result of the determination in the step S303, if the gain of the object signals is not changed (S303, path 'n'), the configured playback environment information and the object metadata information are forwarded to the renderer 200 (S305).

A step S400 is a process of rendering a signal by applying the playback environment information and the object metadata to the decoded signal 101. A step S500 is a process of re-configuring the rendered signal into a channel signal in accordance with the playback environment information.

A step S601 is a process of receiving zoom-related informations 401b, 402c and 402d and determining whether the new object gain is calculated in the step S304.

If zoom-related information is received and a new object gain is calculated (S601, path 'y'), a new channel gain for channel signals is calculated according to the zoom-related informations 401b, 402c, and 402d to output a new channel signal (S602). In this regard, a method for calculating a new channel gain of the step S602 will be described in detail with reference to FIG. 7 and FIG. 8.

On the other hand, if the zoom-related informations 401b, 402c, and 402d are not received and a new object gain is not calculated (S601, path 'n'), the channel signal reconfigured in the step S500 is outputted as it is.

In a step S700, if the audio output rendering type corresponds to the binaural rendering, the channel signal generated in the step S602 or S500 is filtered in the BRIR data 301 received separately in the binaural renderer 300 to output a surround 2-channel audio signal.

Figure 4:
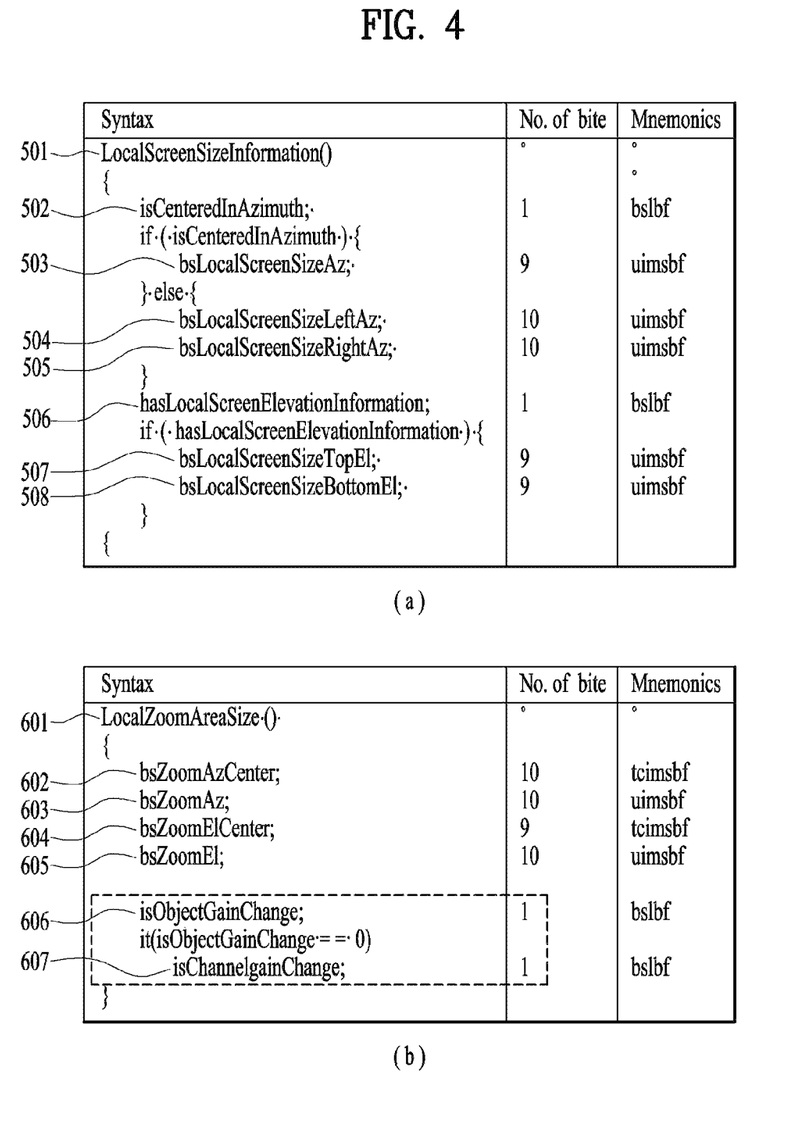
FIG. 4 illustrates one example of an audio syntax for providing video screen information according to the present invention.

FIG. 4 (a) and FIG. 4 (b) illustrate examples of an audio syntax for providing video screen information according to the present invention. In particular, FIG. 4 (a) is a syntax for providing the local screen size information 401b. Also, FIG. 4 (b) is a syntax for providing the zoom area information 402c.

Referring to FIG. 4 (a), a 'LocalScreenSizeInformation( )' syntax 501, the following information fields may be included.

An isCenteredInAzimuth field 502 defines whether a screen is located at the center of a playback environment in terms of an azimuth angle. That is, it is defined whether the screen is located in front of a user in terms of azimuth. If the screen is located at the center of the azimuth angle, a bsLocalScreenSizeAz field 503 defines an azimuth angle corresponding to left and right edge portions from the center of the screen. If the screen is not located at the center of the azimuth, a bsLocalScreenSizeLeftAz field 504 defines an azimuth angle corresponding to the left edge portion of the screen. If the screen is not located at the center of the azimuth, a bsLocalScreenSizeRightAz field 505 defines an azimuth angle corresponding to the right edge of the screen. A hasLocalScreenElevationInformation field 506 defines whether elevation angle information is receivable. A bsLocalScreenSizeTopEl field 507 defines an elevation angle corresponding to a top edge of the screen. A bsLocalScreenSizeBottomEl field 508 defines an elevation angle corresponding to a bottom edge of the screen.

Referring to FIG. 4 (b), in a 'LocalZoomAreaSize' syntax 601, the following information fields may be included.

A bsZoomAzCenter field 602 defines an azimuth angle for a position corresponding to a middle point between left and right edges of a zoom area. A bsZoomAz field 603 defines an offset azimuth angle from an intermediate point in terms of the azimuth angle of the zoom area to the left and right edges.

A bsZoomElCenter field 604 defines an elevation angle for a position corresponding to a middle point between top and bottom edges of the zoom area. A bsZoomEl field 605 defines an offset elevation angle from a middle point in terms of the elevation of the zoom area to the top and bottom edges. Also, an isObjectGainChange field 606 defines whether a gain control function is capable of being linked to an object signal during a screen zooming. An isChannelGainChange metric field 607 defines whether the gain control function is capable of being linked to an output channel signal during the screen zooming.

In this regard, the isObjectGainChange field 606 and the isChannelGainChange field 607 are the informations added for the new object gain and channel gain calculation of the present invention, and may be referred to as first control flag information and second control flag information, respectively.

In this regard, the first control flag information (isObjectGainChange, 606) indicates whether an object gain value is changed, and a new object gain value is calculated only when a change of the object gain value is allowed by the first control flag information. In addition, the second control flag information (isChannelGainChange, 607) indicates whether a channel gain value is changed, and a new channel gain value is calculated only if the change of each audio channel gain value is allowed by the second control flag information.

In this regard, described in the following is a method for the first control flag information (isObjectGainChange, 606) and the second control flag information (isChannelGainChange, 607) to be included in a syntax for receiving information related to a screen size during a screen zooming in an MPEG-H 3D Audio decoder. First of all, the first control flag information 606 asking whether to change a gain of an object signal is added. Secondly, if the gain of the object signal is not changed, the second control flag information 607 asking whether to change a gain of a channel signal is added. That is, whether a gain of an object and/or channel is changed is provided as an optional tool, thereby being operable only if a user desires.

Hereinafter, the new object gain calculation method of the step S304 and the new channel gain calculation method of the step S602, which are linked to the video screen zoom, will be described in detail with reference to FIGS. 5 to 8.

1. Object Gain Control Method (Gain control method of object signal according to screen zoom information)

In 'LocalScreenSizeInformation( )' of FIG. 4 (a), a width of a screen viewed by a user is represented as left and right azimuth angles, and a height of the screen is represented as an elevation angle of top and bottom ends. In FIG. 4 (b), zoom area information in 'LocalZoomAreaSize( )' is information used when zooming a prescribed area of a screen currently viewed by a user and represents a width and height of an enlarged area enlarged by a zoom as an offset azimuth angle and an offset elevation angle, respectively. Moreover, a position corresponding to the center of a zoom area is additionally received as information of the azimuth angle and the elevation angle so that a degree of deviation from the center of the screen may be numerically confirmed. According to the present invention, when a user zooms the screen, a gain of a played audio signal may be changed together according to a zoom ratio.

Figure 5:
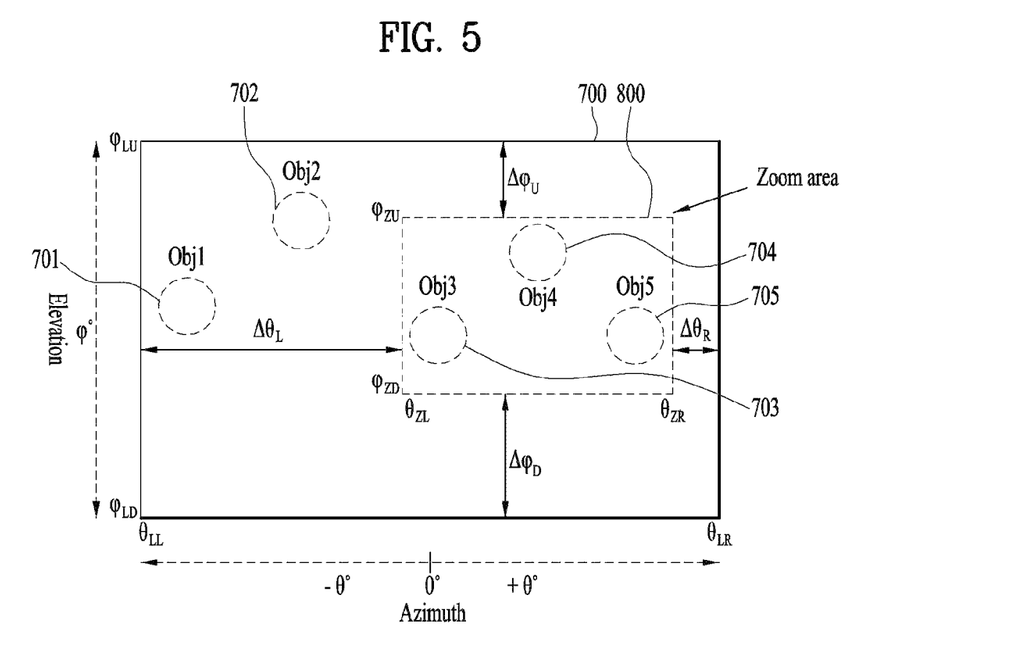
FIGS. 5 to 8 are diagrams to describe operations of the present invention.

FIG. 5 illustrates, for example, a selection of a zoom area 800 in a screen 700. In particular, the relationship between display information of the screen 700 and display information of the zoom area 800 is shown. First, in order to calculate a magnification ratio of the zoom area 800, a difference from each edge of the screen 700 to each edge of the zoom area 800 is calculated. In FIG. 5, each of $\theta_{LL}$, $\theta_{LR}$, $\varphi_{LU}$, and $\varphi_{LD}$ denotes an angle corresponding to each edge of the screen 700. In addition, each of $\theta_{ZL}$, $\theta_{ZR}$, $\varphi_{ZU}$, and $\varphi_{ZD}$ denotes an angle corresponding to each edge of the zoom area 800. In addition, $\Delta\theta_L$ refers to a difference between the left edge of the screen 700 and the left edge of the zoom area 800, and $\Delta N_R$ refers to a difference between a right edge of the screen 700 and a right edge of the zoom area 800. Accordingly, a zoom ratio is calculated as shown in Equation 1 below.

$$R = 1\left(\frac{|\theta_{LL} - \theta_{LR}| - |\Delta\theta_L - \Delta\theta_R|}{|\theta_{LL} - \theta_{LR}|}\right) \quad \text{Equation (1)}$$

In the equation (1), $\Delta\theta_L = |\theta_{LL} - \theta_{ZL}|$, $\Delta\theta_R = |\theta_{ZR} - \theta_{LR}|$.

Figure 6:
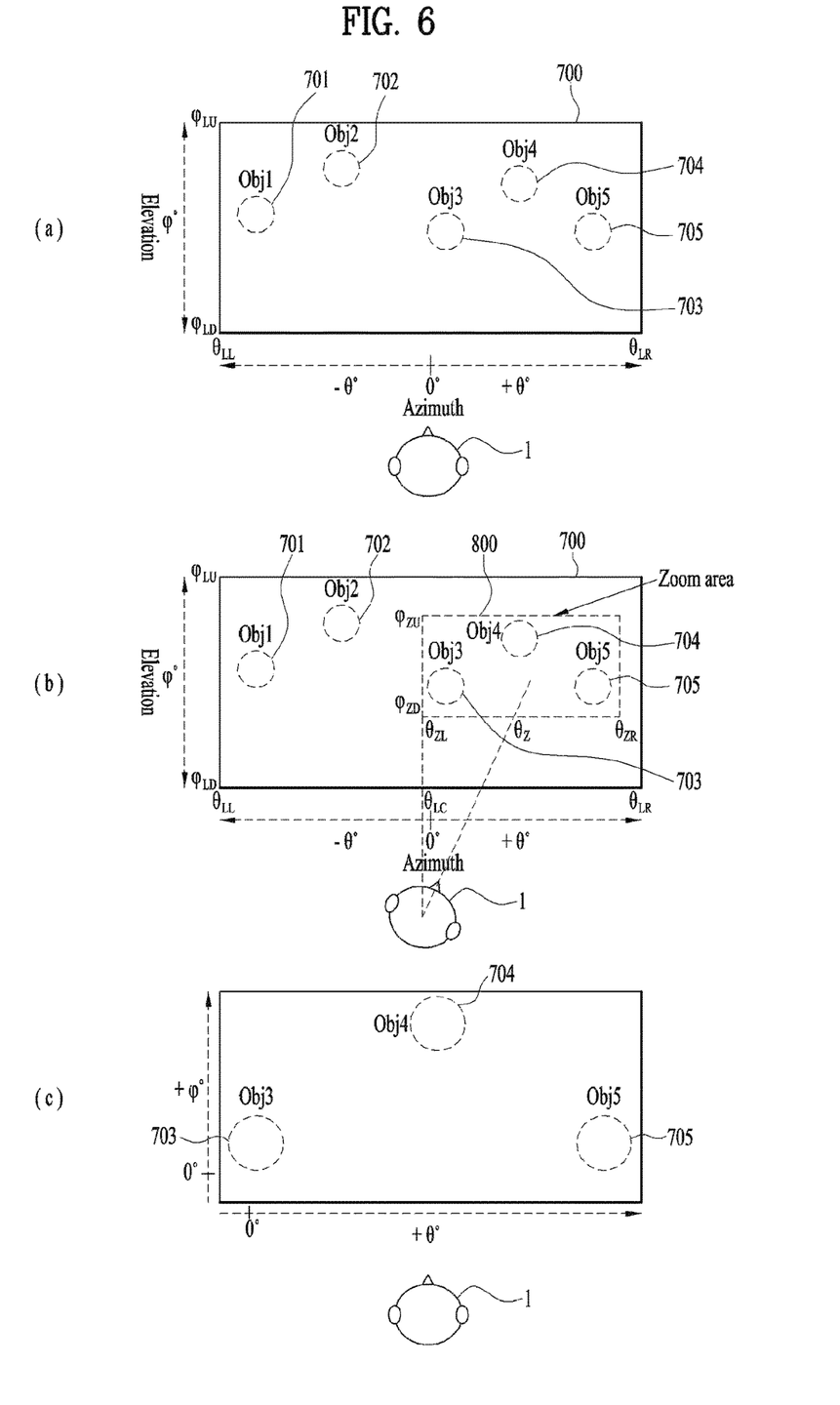

FIGS. 6 (a), 6 (b), and 6 (c) illustrate, for example, an object change according to the selection of a zoom area 800 in a screen 700. FIG. 6 (a) illustrates, for example, a plurality of audio objects 701, 702, 703, 704 and 705 in the screen before the zoom area is selected. FIG. 6 (b) illustrates, for example, a case that a user 1 selects a specific area in the screen 700 as the zoom area 800. In this regard, since a zooming is applicable to all areas of the screen 700, even if a center of the screen before the zoom corresponds to 0° in terms of an azimuth angle, a center of the zoom area may not correspond to 0° in terms of the azimuth angle.

FIG. 6 (c) shows an example that the selected zoom area 800 is enlarged into a size of the existing screen 700 so that a user views a front side of the zoom area 800. Yet, the selection and display of the zoom area 800 is not necessarily performed by a uniform method only. That is, it is possible to select a specific area in the screen 700 as the zoom area 800 in a manner that the user 1 watches the corresponding area by turning a user's head or moves close to the center of the zoom area by turning a user's body.

In addition, a variation of a gain according to a zooming is not equally applicable to all objects 703, 704 and 705 that are located on the screen. According to the present invention, an angle difference value corresponding to a center of a screen and a center of a zoom area is referred to in order to apply a different gain variation per object.

In the 'LocalZoomAreaSize( )' syntax of FIG. 4 (b), bsZoomAzCenter and bsZoomElCenter are informations indicating an azimuth angle and an elevation angle corresponding to the center of a zoom area. In addition, the informations may refer to a viewing direction of a user. Besides, the zooming may bring an effect that the user seems to get closer to a specific area of the screen (e.g., a zoom area). Therefore, according to the present invention, assuming that that the user is very close to the center of the zoom area, an approximate distance between the user and each object is calculated by referring to an angle corresponding to the center of the zoom area and an angle corresponding to a position at which each of the objects 703, 704 and 705 is located in the zoom area 800.

Specifically, a difference between a position having a random object N located thereat and a position corresponding to a center of a zoom area is calculated into $\Delta(POS_{ZC}, POS_{obj\_N}) = |\theta_{ZC} - \theta_{obj\_N}| + |\varphi_{ZC} - \varphi_{obj\_N}|$. Namely, the smaller the value of $\Delta(POS_{ZC}, POS_{obj\_N})$ becomes, the closer the object gets to a user. And, the bigger the value of $\Delta(POS_{ZC}, POS_{obj\_N})$ becomes, the farther the object gets away from the user. Therefore, when the azimuth angle and the elevation angle corresponding to the object located position are $(\theta_{ZC}, \varphi_{ZC})$, the distance from the user is minimized, and when the azimuth angle and the elevation angle corresponding to the object located position are $(\theta_{ZC}+180, \varphi_{ZC}+180)$, the distance from the user is maximized.

In the present invention, a gain control according to a zooming is applied only to the objects 703, 704, and 705 located in the zoom area 800. Through the zoom ratio R calculated by Equation (1), it can be seen whether there is an effect that a user gets several times closer to a screen than an existing position. If the inverse square law that a size of a sound pressure is inversely proportional to the square of a distance, a changed gain of an object is calculated as shown in Equation (2).

$$G_{new} = \sqrt{G^2 R^2} = GR \qquad \text{Equation (2)}$$

In Equation (2), G is a gain before a zoom, and $G_{new}$ refers to a gain changed by a zooming. The equation (2) is a formula applied when an object is located in front of a user. If an object is located at a random position of a screen other than the front side, a gain of the object is calculated by Equation (3) below.

$$G_{new} = GR\left(1 - \frac{\Delta(POS_{ZC}, POS_{obj\_N})}{|\theta_{ZC}+180| + |\varphi_{ZC}+180|}\right) \qquad \text{Equation (3)}$$

In Equation (3), the closer an object position $POS_{obj\_N}$ approaches $POS_{ZC}$, the smaller $\Delta(POS_{ZC}, POS_{obj\_N})$ becomes, whereby a variation of a gain becomes large. And, the larger $\Delta(POS_{ZC}, POS_{obj\_N})$ becomes, the smaller a variation of the gain becomes. Also, $|\theta_{ZC}+180|+|\varphi_{ZC}+180|$ is the angle corresponding to when positioned farthest from the center of a zoom area. In other words, this value cannot appear in a zooming process in case that an object is located behind a user. Yet, this value is assumed as a maximum value $\Delta(POS_{ZC}, POS_{obj\_N})$ can have in Equation (3) and used as a reference value when calculating a variation of a gain.

The equation (2) or equation (3) is applied to the step S304 of FIG. 3 described above, and means a new gain value applied to an object located in the zoom area.

2 Channel Gain Control Method (Gain Control Method of Channel Signal According to Screen Zoom Area)

As described above, a screen zooming function is applied only to an object in the conventional MPEG-H 3D Audio decoder. Namely, since a zoom function is not linked to channel-type signals, the characteristics of a channel signal do not change even though a specific area of a screen is zoomed. Yet, as described above, if a gain of a channel signal changes according to a zooming, a user may feel higher sense of realism. Hereinafter, a method for calculating a new channel gain value in response to a zoom area selection according to the present invention will be described.

In general, a channel type signal does not have an exact position defined unlike an object. Yet, a playback speaker environment utilized for an audio decoding is configured, and a channel signal is reconfigured to fit a configured speaker environment through a channel converting process. Therefore, a gain of a channel signal may be changed according to a zooming by referring to position information of the playback speaker. First of all, when a specific area is zoomed on a screen, a zoom ratio may be calculated by Equation 1 described above. Also, since an angle corresponding to the center of a zoom area can be obtained by LocalozoomAreaSize( ) syntax, a gain of a channel signal outputted to each speaker may be changed in the same manner of changing the gain of the object signal. Yet, regarding a channel type signal, unlike an object type signal, it is unable to obtain position information of a sound source on a screen. Yet, a position of the sound source may be estimated in a prescribed direction on the screen through size information of a sound outputted through the speaker.

Figure 7:
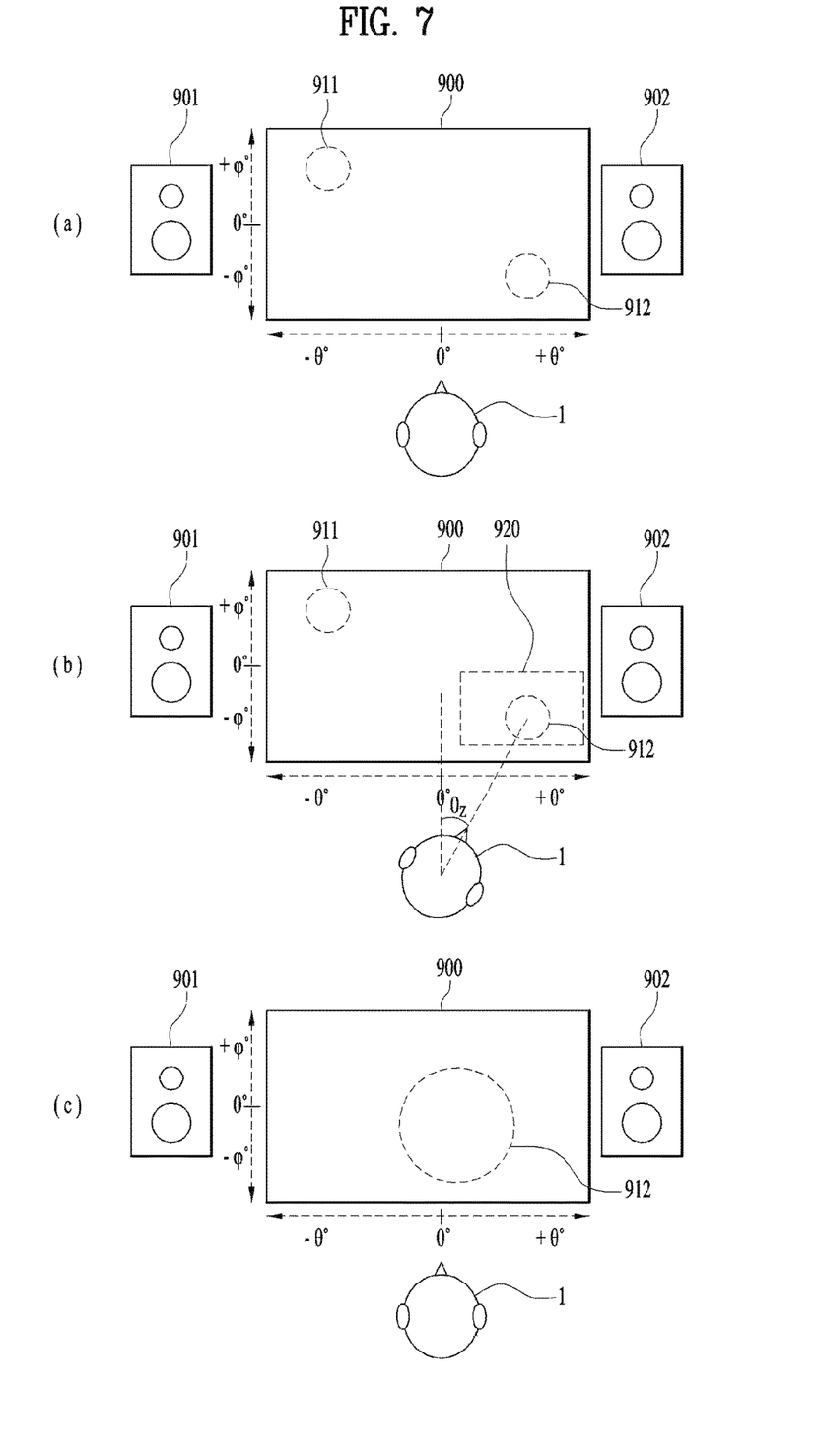

FIG. 7 is a diagram illustrating a time for a user to zoom a specific area of a screen 900 in a stereo playback environment. Referring to FIG. 7 (a), shown is an example of a case that two speakers 901 and 902 are installed on the left and right sides of the screen 900 and that two sound sources 911 and 922 are played back on the screen 900. In a speaker environment, although the two sound sources 911 and 912 are played back through both of the speakers 901 and 902, the left sound source 911 in the screen is played back louder in the left speaker 901 but the right sound source 912 in the screen is played back louder in the right speaker 902. Accordingly, understanding such a principle, according to the present invention, a gain variation and a characteristic variation of a signal according to a zoom area selected by referring to center information of the screen, center information of the zoom area, and position information of the speaker are calculated per speaker. Hereinafter, this will be described in detail as follows.

Figure 8:
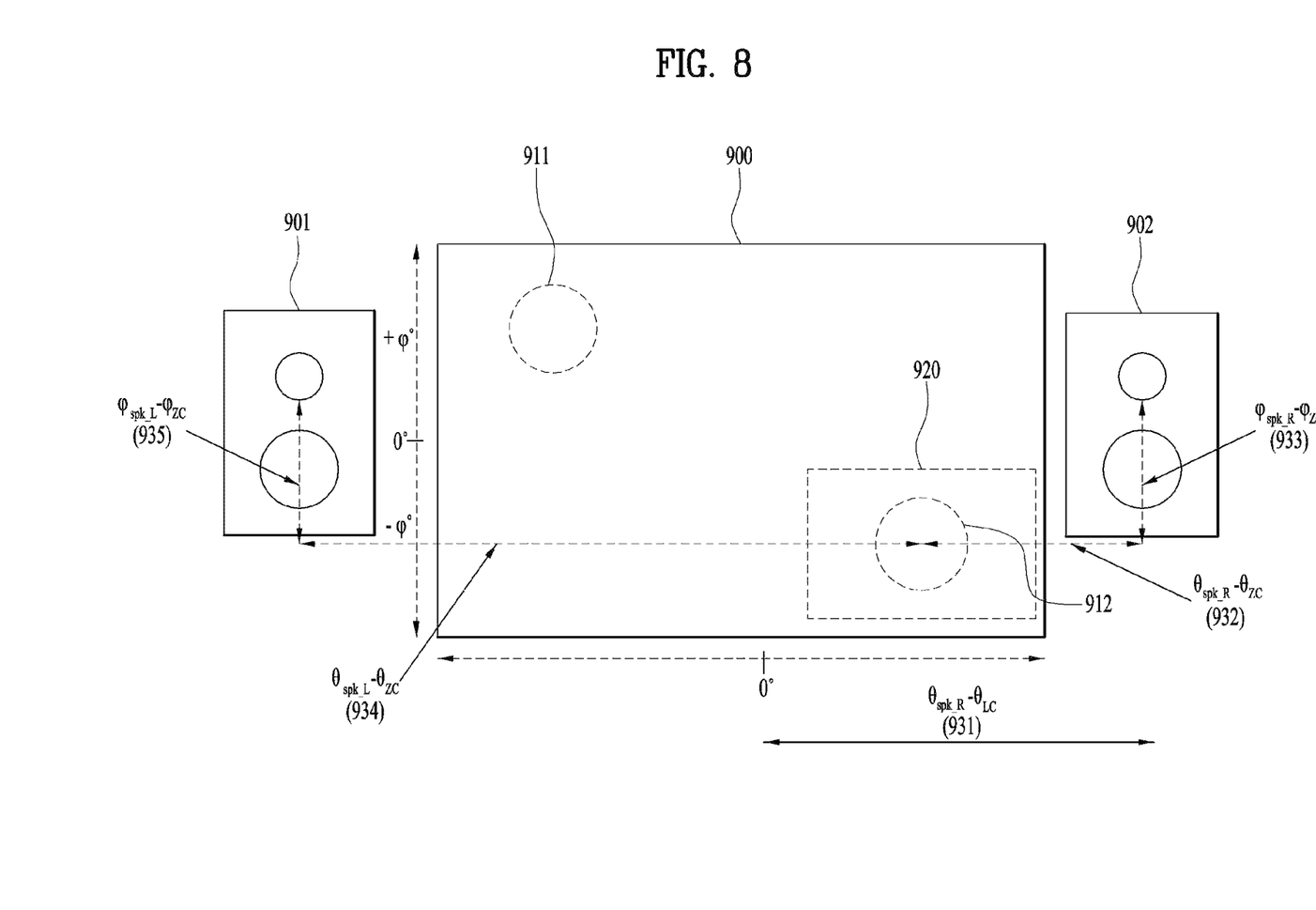

FIG. 8 shows information necessary to calculate the channel gain variation. In FIG. 8, $(\theta_{spk\_L}, \varphi_{spk\_L})$ and $(\theta_{spk\_R}, \varphi_{spk\_R})$ refer to position informations of left and right speakers 901 and 902, respectively. Also, $\theta_{spk\_R} \theta_{LC}$ 931 indicates an azimuth difference between a center of a screen and a position of the right speaker 902. Also, $\theta_{spk\_R} \theta_{ZC}$ 932 indicates an azimuth difference between a center of a zoom area and a position of the right speaker 902. In addition, $\varphi_{spk\_R} \varphi_{ZC}$ 933 indicates an elevation difference between the center of the zoom area and the position of the right speaker 902. Also, $\theta_{spk\_L} \theta_{ZC}$ 934 indicates an azimuth difference between the center of the zoom area and the position of the left speaker 901. Also, $\varphi_{spk\_L} \varphi_{ZC}$ 935 indicates an elevation difference between the center of the zoom area and the position of the left speaker 901.

First, find a nearest speaker with reference to a zoom area 920. It is able to find the nearest speaker by calculating a difference between center information of the zoom area 920 and position information of all speakers. For example, in FIG. 8, if a distance from each of the speakers 901 and 902 is calculated with reference to the zoom area 920, it corresponds to $\Delta(POS_{ZC}, POS_{spk\_L}) > \Delta(POS_{ZC}, POS_{spk\_R}) = (|\theta_{ZC} - \theta_{spk\_L}| + |\varphi_{ZC} - \varphi_{spk\_L}|) > (|\theta_{ZC} - \theta_{spk\_R}| + |\varphi_{ZC} - \varphi_{spk\_R}|)$. Thus, in this case, it can be seen that the right speaker 902 is a near speaker. Next, a ratio of a distance between the zoom area 920 and the near speaker 902 to each of the distances from other speakers is calculated using Equation (4) below. In this regard, FIG. 8 shows the stereo environment for example, so it is possible to perform calculation on the left speaker 901 only. Yet, the stereo case is generalized into a case of a plurality of multi-channels and then calculated into Equation 4 below.

$$R_{ZC} = \frac{(|\theta_{spk\_ch} - \theta_{ZC}| + |\varphi_{spk\_ch} - \varphi_{ZC}|)}{(|\theta_O - \theta_{ZC}| + |\varphi_O - \varphi_{ZC}|)} \quad \text{Equation (4)}$$

$$\text{where } o = \underset{spk\_ch}{\operatorname{argmin}}(|\theta_{spk\_ch} - \theta_{ZC}| + |\varphi_{spk\_ch} - \varphi_{ZC}|)$$

In Equation 4, $(|\theta_O \theta_{ZC}| + |\varphi_O \varphi_{ZC}|)$ refers to a distance between the zoom area and a nearest speaker. For example, in FIG. 8, the nearest speaker corresponds to the right speaker 902. $(|\theta_{spk\_ch} \theta_{ZC}| + |\varphi_{spk\_ch} \varphi_{ZC}|)$ refers to distances between the zoom area and the rest of speakers other than the nearest speaker. As described above, in the speaker environment as shown in FIG. 8, two sound sources on the screen are all played back from the two speakers 901 and 902. Therefore, it is difficult to change a position of a sound image according to the zoom area by only controlling a gain of each channel. For example, as shown in FIG. 7 (b), when a right area is zoomed, as shown in FIG. 7 (c), as a sound image located on a right side appears on the screen, the right sound image should be heard louder on both of the right and left channels. Yet, since the left channel is already occupied dominantly by the left sound image on the screen (i.e., since the sound of the left sound image is louder), the left sound image is played back louder despite applying any gain value. Therefore, Equation (5) below is applied to all the rest of channel signals except a channel signal nearest to the zoom area.

$$S_{ch} = S_{ch} + \left(1 - \frac{1}{R_{ZC}}\right) S_o \quad \text{Equation (5)}$$

In Equation (5), $S_{CH}$ means a channel signal, and $S_O$ is a channel signal corresponding to a speaker nearest to a zoom area. Looking at the formula within a parenthesis of Equation (5), as a random channel signal gets away from the zoom area, a value in the parenthesis increases more (i.e., $R_{ZC}$ increases). That is, as a position at which a random channel signal is played back (i.e. a position of a played speaker) gets away from the zoom area, a channel signal nearest to the zoom area may be regarded as giving more influence. This phenomenon may be easily thought of intuitively. If a random zoom area is enlarged, a user may think that the user approaches close to the corresponding area. Therefore, a sound image located in the zoom area should be played loudly in a signal played through each of the speakers located at both sides of the screen. For example, in FIG. 7 (b), the right channel signal is added to the left channel signal in the left speaker 901 by enlarging the right area, so that the right channel signal is played back in the left speaker 901. A left sound image is absolutely dominant in an existing left channel signal, and a right sound image in a screen is absolutely dominant in the right channel signal. Yet, when a new left channel signal generated from adding the right channel signal to the left channel is played back by Equation (5), it is possible to move the sound image in a right direction further than that before a zooming. Also, the nearer the zoom area gets to the right speaker 902, the greater the weight of the right signal in the signal played back in the left speaker 901 becomes. At the same time, since left sound image information still remains in the signal of the left speaker 901, which is newly played back, it may bring an effect that the sound image is located on the left side of the screen despite not appearing on the screen.

For another example, if a center portion in the screen is selected as the zoom area 920 (i.e., if a distance from the left speaker is equal to that from the right speaker in the zoom area), Equation (4) is calculated into '1', so that the parenthesis portion of Equation (5) finally becomes zero. That is, if the center of the screen is zoomed, it may result in not being affected by another channel. The corresponding process is a process of changing a sound image of a sound source in accordance with the zoom area, and only applies to speakers located on the front side in consideration of a position of the screen. Finally, if a zoom ratio R is applied to all channel signals like Equation 6, the channel signal can be changed according to a screen zooming.

$$S_{ch} = S_{ch} \cdot R \quad \text{Equation (6)}$$

MODE FOR INVENTION

Figure 9:
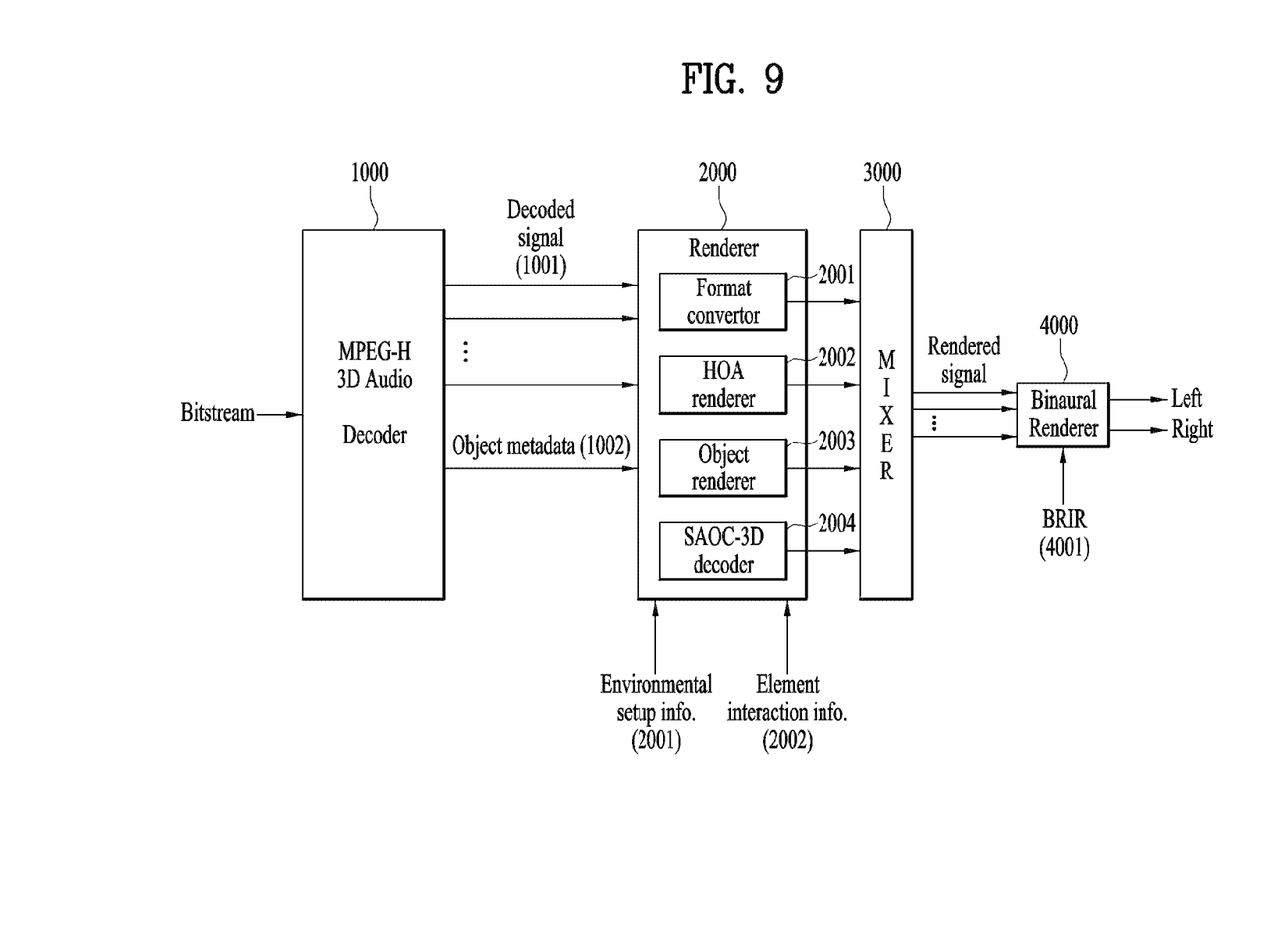
FIG. 9 illustrates another embodiment of an audio output apparatus according to the present invention.

FIG. 9 is a block diagram of an audio output apparatus according to another embodiment of the present invention, showing an example of applying an MPEG-H 3D Audio decoder 1000. A bitstream including an audio signal inputted to an audio output apparatus is decoded per audio signal characteristic (e.g., channel, object, Spatial Audio Object Coding (SAOC), Higher Order Ambisonics (HOA)) through the MPEG-H 3D Audio decoder 1000. Also, the MPEG-H 3D Audio decoder 1000 decodes object metadata.

In addition, by receiving inputs of the environment setup information 2001 and the user interaction information 2002, including the aforementioned syntaxes of FIG. 4 (a) and FIG. 4 (b) at least, from outside, an audio signal decoded in the renderer 2000 is rendered together with the object metadata. The renderer 2000 may be, for example, a format converter 2001 when the audio characteristic is a channel signal, an HOA renderer 2002 when the audio characteristic is an HOA signal, an object renderer 2003 when the audio characteristic is an object signal, and an SAOC 3D decoder 2004 when the audio characteristic an SAOC transport channel. Then, a rendered signal is finally outputted through a mixer 3000. Also, if applying to a e VR environment (i.e., if a rendering type is "binaural rendering"), a three-dimensional sound field sense should be delivered through a 2-channel speaker such as a headphone or earphone. Accordingly, the output signal is filtered by utilizing BRIR information 4001 in a binaural renderer 4000, whereby left and right channel audio signals having the 3D surround effect are outputted.

Besides, FIG. 9 is a block diagram illustrating an overall decoding process of MPEG-H 3D Audio of a binaural rendering type. An audio bitstream is inputted to the MPEG-H 3D Audio decoder 1000 to output the decoded signal 1001 and the object metadata 1002. Next, the playback environment information is received from the environment setup information 2001 and the user interaction information 2002 and applied to the decoded signals 1001. At this time, among the decoded signals, a channel signal is inputted to the format converter 2001, an HOA signal 2002 is inputted to the HOA renderer 2002, and an object signal is inputted to the object renderer 2003 and the SAOC-3D decoder 2004 together with object metadata. If the MPEG-H 3D Audio Decoder 1000 is configured to operate by linking an audio signal to a screen, a characteristic converting process (e.g., position, gain, etc.) according to a screen zooming is entirely processed by the renderer 2000 and applied to the decoded signal. A signal outputted from the renderer 2000 is configured to fit the playback environment through a mixing process in the mixer 300 and then filtered in the BRIR 4001 by the binaural renderer 400, whereby 2-channel left and right output signals are generated finally.

INDUSTRIAL APPLICABILITY

The above-described present invention can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may also include, in whole or in some configurations, an audio decoder, a metadata processor, a renderer, and a binaural renderer. Therefore, this description is intended to be illustrative, and not to limit the scope of the claims. Thus, it is intended that the present invention covers the modifications and variations of this invention provided they come within the scope of the appended claims and their equivalents.

What is claimed is:

1. A method of outputting an audio by an apparatus, the method comprising:
generating a decoded audio signal and an object metadata by receiving an audio signal linked to a video;
changing an object gain value for each object existing in a zoom area in association with a video screen zoom execution based on a first control flag information indicating whether the object gain is changed, a new object gain value calculated only if a change of the object gain value is allowed by the first control flag information, wherein the changing of the object gain value includes:
obtaining a zoom ratio from a zoom area size with respect to a size of an entire video screen; and
calculating each object gain value in consideration of the obtained zoom ratio and a relative position of each object in the zoom area; and
rendering the decoded audio signal based on the changed object gain value.

2. The method of claim 1, further comprising changing a gain value of each audio channel after the rendering.

3. The method of claim 2, further comprising receiving a second control flag information indicating whether a channel gain value is changed, wherein the changing the gain value of the audio channel calculates a new channel gain value only if a change of each audio channel gain value is allowed by the second control flag information.

4. The method of claim 3, the changing the channel gain value, comprising:
determining a channel nearest to the zoom area;
determining a distance ratio between the determined channel nearest to the zoom area and a remaining channel; and
calculating each channel gain value in consideration of the distance ratio per channel.

5. The method of claim 1, further comprising a binaural rendering step based on a Binaural Room Impulse Response (BRIR) to output the rendered audio signal as a 2-channel surround audio.

6. An apparatus for outputting an audio linked to a video screen zoom, the apparatus comprising:
an audio decoder to generate a decoded audio signal and an object metadata by receiving an audio signal linked to a video;
a metadata processor to change an object gain value for each object existing in a zoom area in association with a video screen zoom execution based on a first control flag information indicating whether the object gain is changed, a new object gain value calculated only if a change of the object gain value is allowed by the first control flag information wherein the metadata processor is further configured to obtain a zoom ratio from a zoom area size with respect to a size of an entire video screen and calculate each object gain value in consideration of the obtained zoom ratio and a relative position of each object in the zoom area; and
a renderer to render the decoded audio signal based on the changed object gain value.

7. The apparatus of claim 6, wherein the renderer is configured to change a gain value of each audio channel after the rendering.

8. The apparatus of claim 7, wherein the metadata processor is configured to receive a second control flag information indicating whether a channel gain value is changed and wherein the renderer is configured to calculate a new channel gain value only if a change of each audio channel gain value is allowed by the second control flag information.

9. The apparatus of claim 8, wherein the renderer is configured to determine a channel nearest to the zoom area, determine a distance ratio between the determined channel nearest to the zoom area and a remaining channel, and calculate each channel gain value in consideration of the distance ratio per channel.

10. The apparatus of claim 6, further comprising a binaural renderer to use a Binaural Room Impulse Response (BRIR) to output the rendered audio signal as a 2-channel surround audio.

* * * * *